(12) United States Patent
Johnson et al.

(10) Patent No.: US 11,930,728 B2
(45) Date of Patent: Mar. 19, 2024

(54) CONTROL SYSTEM FOR A DOUBLE-ACTING AIR CYLINDER OF AN AGRICULTURAL IMPLEMENT

(71) Applicant: CNH Industrial America LLC, New Holland, PA (US)

(72) Inventors: Chad Michael Johnson, Arlington Heights, IL (US); Trevor Phillip Stanhope, Oak Lawn, IL (US); Michael Christopher Conboy, Chicago, IL (US); Grant Thomas Macdonald, Hampshire, IL (US)

(73) Assignee: CNH Industrial America LLC, New Holland, PA (US)

( * ) Notice: Subject to any disclaimer, the term of this patent is extended or adjusted under 35 U.S.C. 154(b) by 390 days.

(21) Appl. No.: 17/244,201

(22) Filed: Apr. 29, 2021

(65) Prior Publication Data

US 2022/0346300 A1  Nov. 3, 2022

(51) Int. Cl.
*A01B 63/00* (2006.01)
*A01B 61/04* (2006.01)
*A01B 63/111* (2006.01)

(52) U.S. Cl.
CPC .......... *A01B 63/008* (2013.01); *A01B 61/048* (2013.01); *A01B 63/111* (2013.01)

(58) Field of Classification Search
CPC .... A01B 63/008; A01B 63/111; A01B 61/048
See application file for complete search history.

(56) References Cited

U.S. PATENT DOCUMENTS

| 6,938,365 B2 | 9/2005 | Wright |
| 8,550,020 B2 | 10/2013 | Sauder et al. |
| 8,634,992 B2 | 1/2014 | Sauder et al. |

(Continued)

FOREIGN PATENT DOCUMENTS

CN  104255126  1/2015

OTHER PUBLICATIONS

Hoshino et al., "Control of Generated Force and Stiffness in Pneumatic Air Cylinder Actuator," EMBS International Conference on Biomedical Robotics and Biomechatronics, 2006, 6 pgs, IEEE Publication.

(Continued)

*Primary Examiner* — Tara Mayo
(74) *Attorney, Agent, or Firm* — Rebecca L. Henkel; Rickard K. DeMille (57) ABSTRACT

A control system for a double-acting air cylinder of an agricultural implement includes a valve assembly configured to control a base end air pressure and a rod end air pressure of the double-acting air cylinder. The control system also includes a controller communicatively coupled to the valve assembly. The controller is configured to determine a target base end air pressure and a target rod end air pressure based on a target force of the double-acting air cylinder and a target damping factor of the double-acting air cylinder. The controller is also configured to control the valve assembly such that a first difference between the base end air pressure and the target base end air pressure is less than a first threshold value and a second difference between the rod end air pressure and the target rod end air pressure is less than a second threshold value.

20 Claims, 3 Drawing Sheets

(56) References Cited

U.S. PATENT DOCUMENTS

| | | | |
|---|---|---|---|
| 9,078,392 B2 | 7/2015 | Van Buskirk et al. | |
| 9,215,837 B2 | 12/2015 | Adams et al. | |
| 10,412,877 B2 * | 9/2019 | Barrick et al. | A01B 63/22 |
| 2003/0070541 A1 | 4/2003 | Migliori | |
| 2013/0248212 A1 * | 9/2013 | Bassett | A01B 71/02 |
| | | | 172/4 |
| 2014/0116735 A1 * | 5/2014 | Bassett | A01C 7/203 |
| | | | 172/430 |
| 2016/0100517 A1 | 4/2016 | Bassett | |
| 2019/0000006 A1 * | 1/2019 | Blunier et al. | A01B 76/00 |

OTHER PUBLICATIONS

Scroggins, "LDTs Monitor Tillage Depth Through Cylinder," Hydraulics & Pneumatics, 2019, 11 pgs.

* cited by examiner

CONTROL SYSTEM FOR A DOUBLE-ACTING AIR CYLINDER OF AN AGRICULTURAL IMPLEMENT

BACKGROUND

The present disclosure relates generally to a control system for a double-acting air cylinder of an agricultural implement.

Generally, planting implements (e.g., planters) are towed behind a tractor or other work vehicle via a mounting bracket secured to a rigid frame of the implement. Planting implements typically include multiple row units distributed across a width of the implement. Each row unit is configured to deposit seeds at a desired depth beneath the soil surface of a field, thereby establishing rows of planted seeds. For example, each row unit typically includes an opener that forms a seeding path (e.g., trench) for seed deposition into the soil. An agricultural product conveying system (e.g., seed tube or powered agricultural product conveyor) is configured to deposit seeds and/or other agricultural products (e.g., fertilizer) into the trench. The opener/agricultural product conveying system is followed by closing disc(s) that move displaced soil back into the trench and/or packer wheel(s) that pack the soil on top of the deposited seeds/other agricultural products. Certain row units may also include residue management wheel(s) positioned in front of the opener and configured to break up and/or displace residue and debris (e.g., clods) on the soil surface.

Certain planting implements include a control system configured to control a force applied by the closing disc(s) to the soil and/or a force applied by the packer wheel to the soil during operation of the planting implement, thereby establishing a desired soil profile behind the planted seeds/other agricultural products. Additionally or alternatively, the control system may control a force applied by the residue management wheel(s) to enable the residue management wheel(s) to effectively break up/displace the residue. For example, the force applied by at least one ground-engaging tool (e.g., the closing disc(s), the packer wheel(s), the residue management wheel(s), or a combination thereof) to the soil may be controlled by respective air cylinder(s), and the control system may control air pressure within the respective air cylinder(s).

BRIEF DESCRIPTION

In certain embodiments, a control system for a double-acting air cylinder of an agricultural implement includes a valve assembly configured to control a base end air pressure within a base end of the double-acting air cylinder and to control a rod end air pressure within a rod end of the double-acting air cylinder. The double-acting air cylinder is configured to apply a force to a ground-engaging tool of the agricultural implement based on the base end air pressure and the rod end air pressure. The control system also includes a controller communicatively coupled to the valve assembly, and the controller includes a memory and a processor. The controller is configured to determine a target base end air pressure and a target rod end air pressure based on a target force of the double-acting air cylinder and a target damping factor of the double-acting air cylinder. In addition, the controller is configured to control the valve assembly such that a first difference between the base end air pressure and the target base end air pressure is less than a first threshold value and a second difference between the rod end air pressure and the target rod end air pressure is less than a second threshold value.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
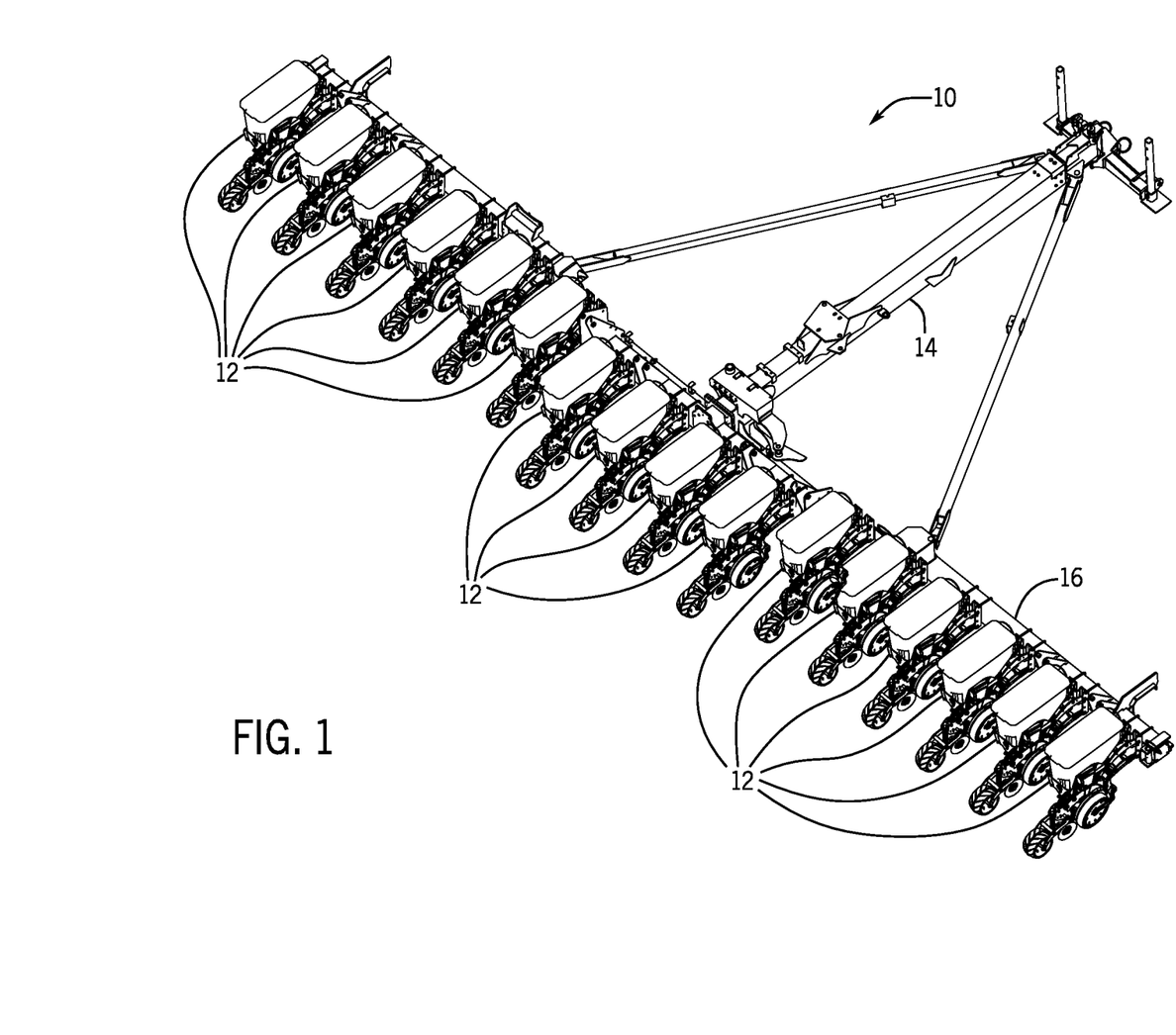
FIG. 1 is a perspective view of an embodiment of an agricultural implement having multiple row units distributed across a width of the agricultural implement.

FIG. 1 is a perspective view of an embodiment of an agricultural implement 10 (e.g., planting implement, planter) having multiple row units 12 (e.g., planter row units) distributed across a width of the agricultural implement 10. The agricultural implement 10 is configured to be towed through an agricultural field behind a work vehicle, such as a tractor. As illustrated, the agricultural implement 10 includes a tongue assembly 14, which includes a hitch configured to couple the agricultural implement 10 to an appropriate tractor hitch (e.g., via a ball, clevis, or other coupling). The tongue assembly 14 is coupled to a tool bar 16 which supports multiple row units 12. Each row unit 12 may include one or more opener discs configured to form a seed path (e.g., trench) within soil of a field. The row unit 12 may also include an agricultural product conveying system (e.g., seed tube or powered agricultural product conveyer) configured to deposit seeds and/or other agricultural product(s) (e.g., fertilizer) into the seed path/trench. In addition, the row unit 12 may include closing disc(s) and/or packer wheel(s) positioned behind the agricultural product conveying system. The closing disc(s) are configured to move displaced soil back into the seed path/trench, and the packer wheel(s) are configured to pack soil on top of the deposited seeds/other agricultural product(s). Additionally or alternatively, the row unit 12 may include residue management wheel(s) positioned in front of the opener discs and configured to break up and/or displace residue and debris (e.g., clods) on a surface of the soil.

In certain embodiments, the agricultural implement 10 includes a control system for a double-acting air cylinder of the agricultural implement. The double-acting air cylinder is configured to apply a force (e.g., an up-force and a down-force) to a ground-engaging tool of the agricultural implement 10, such as the closing disc(s), the packer wheel(s), or the residue management wheel(s) of a respective row unit 12. The control system includes a valve assembly configured to control a base end air pressure within a base end of the double-acting air cylinder and to control a rod end air pressure within a rod end of the double-acting air cylinder, thereby controlling the force applied by the double-acting air cylinder to the ground-engaging tool. In addition, the control system includes a controller communicatively coupled to the valve assembly and having a memory and a processor. The controller is configured to determine a target base end air pressure and a target rod end air pressure based on a target force of the double-acting air cylinder and a target damping factor of the double-acting air cylinder. The controller is also configured to control the valve assembly such that a difference between the base end air pressure and the target base end air pressure is less than a first threshold value and a difference between the rod end air pressure and the target rod end air pressure is less than a second threshold value. Because the air pressures within the base end and the rod end of the double-acting air cylinder are automatically controlled based on the target force and the target damping factor, operation of the agricultural implement may be readily adjusted for different soil conditions and/or agricultural implement properties (e.g., speed, position, etc.). For example, an operator may input the target force and/or the target damping factor via a user interface, and/or the controller may automatically determine the target force and/or the target damping factor based on feedback from sensor(s) (e.g., feedback indicative of one or more properties of the agricultural implement and/or one or more properties of the agricultural field).

Figure 2:
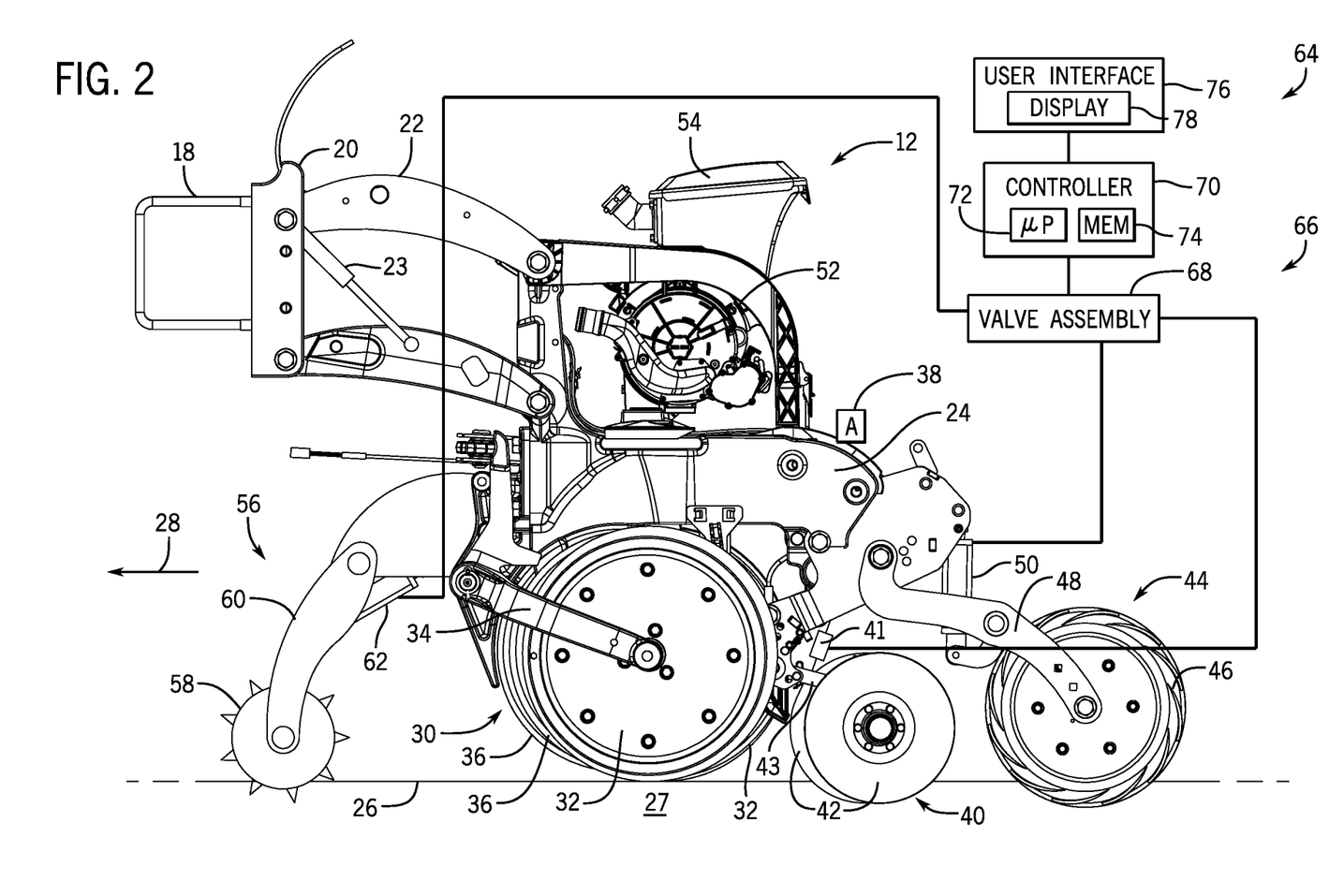
FIG. 2 is a side view of an embodiment of a row unit that may be employed on the agricultural implement of FIG. 1.

FIG. 2 is a side view of an embodiment of a row unit 12 (e.g., agricultural row unit) that may be employed on the agricultural implement of FIG. 1. The row unit 12 includes a mount 18 configured to secure the row unit 12 to the tool bar of the agricultural implement. In the illustrated embodiment, the mount 18 includes a u-bolt that secures a bracket 20 of the row unit 12 to the tool bar. However, in other embodiments, the mount may include another suitable device that couples the row unit to the tool bar. A linkage assembly 22 extends from the bracket 20 to a frame 24 of the row unit 12. The linkage assembly 22 is configured to enable vertical movement of the frame 24 relative to the tool bar in response to variations in a surface 26 of the soil 27. In certain embodiments, a down pressure system 23 (e.g., including a hydraulic actuator, a pneumatic actuator, etc.) may be coupled to the linkage assembly 22 and configured to urge the frame 24 toward the soil surface 26. While the illustrated linkage assembly 22 is a parallel linkage assembly (e.g., a four-bar linkage assembly), in other embodiments, another suitable linkage assembly may extend between the bracket and the frame.

The row unit 12 is configured to deposit seeds and/or other agricultural product(s) at a target depth beneath the soil surface 26 as the row unit 12 traverses a field along a direction of travel 28. The row unit 12 includes an opener assembly 30 that forms a trench in the soil 27 for seed/other agricultural product deposition into the soil. In the illustrated embodiment, the opener assembly 30 includes gauge wheels 32, arms 34 that pivotally couple the gauge wheels 32 to the frame 24, and opener discs 36. The opener discs 36 are configured to excavate a trench into the soil 27, and the gauge wheels 32 are configured to control a penetration depth of the opener discs 36 into the soil. In the illustrated embodiment, the row unit 12 includes a depth control actuator 38 configured to control the vertical position of the gauge wheels 32 (e.g., by blocking rotation of the arms in the upward direction beyond a selected orientation), thereby controlling the penetration depth of the opener discs 36 into the soil. The depth control actuator 38 may include any suitable type(s) of actuator(s) (e.g., hydraulic actuator(s), pneumatic actuator(s), electromechanical actuator(s), manual lever, manual knob, etc.), and the depth control actuator 38 may control the vertical position of the gauge wheels 32 via any suitable mechanical linkage (e.g., a linkage configured to block rotation of the arms 34 in the upward direction beyond a selected orientation that is controlled by the depth control actuator 38). While the illustrated opener assembly 30 includes two gauge wheels 32 and two opener discs 36 in the illustrated embodiment, in other embodiments, the opener assembly may include more or fewer gauge wheels (e.g., 0, 1, 3, or more) and/or more or fewer opener discs (e.g., 0, 1, 3, or more). For example, in certain embodiments, the gauge wheels may be omitted, and other suitable device(s) (e.g., skid(s), ski(s), etc.) may be used to control the penetration depth of the opener disc(s) into the soil. Furthermore, in certain embodiments, the opener discs may be omitted, and other suitable opener(s) (e.g., shank(s), knife/knives, etc.) may be used to form the trench within the soil.

The row unit 12 also includes an agricultural product conveying system (e.g., seed tube or powered agricultural product conveyor) configured to deposit seeds and/or other agricultural product(s) (e.g., fertilizer) into the trench. The opener assembly 30 and the agricultural product conveying system are followed by a closing assembly 40 that moves displaced soil back into the trench. In the illustrated embodiment, the closing assembly 40 includes two closing discs 42. However, in other embodiments, the closing assembly may include other suitable closing device(s) (e.g., a single closing disc, etc.). In the illustrated embodiment, the closing assembly 40 includes a double-acting air cylinder 41 extending between the frame 24 of the row unit 12 and an arm 43 of the closing assembly 40. As illustrated, the arm 43 is pivotally coupled to the frame 24, and the double-acting air cylinder 41 is configured to control a force applied by the closing disc(s) 42 to the soil 27. Furthermore, while the double-acting air cylinder 41 extends to the arm 43 of the closing assembly 40 in the illustrated embodiment, in other embodiments, the double-acting air cylinder may extend to any suitable portion of the closing assembly (e.g., in embodiments in which the arm is omitted), such as to a hub of the closing disc(s). In addition, in certain embodiments, the closing assembly, including the closing disc(s), the arm, and the double-acting air cylinder, may be omitted.

In the illustrated embodiment, the closing assembly 40 is followed by a packing assembly 44 configured to pack soil on top of the deposited seeds and/or other agricultural product(s). The packing assembly 44 includes a packer wheel 46, an arm 48 that pivotally couples the packer wheel 46 to the frame 24, and a double-acting air cylinder 50 configured to control a force applied by the packer wheel 46 to the soil surface 26, thereby enabling the packer wheel to pack soil on top of the deposited seeds and/or other agricultural product(s). As illustrated, the double-acting air cylinder 50 extends between the frame 24 of the row unit 12 and the arm 48 of the packing assembly 44. However, in other embodiments, the double-acting air cylinder may extend to any other suitable portion of the packer assembly, such as to a hub of the packer wheel. While the packing assembly 44 includes a single packer wheel 46 in the illustrated embodiment, in other embodiments, the packing assembly may include one or more additional packer wheels (e.g., arranged in a tandem configuration). Furthermore, in certain embodiments, the packing assembly, including the packer wheel, the arm, and the double-acting air cylinder, may be omitted.

The row unit 12 includes a vacuum seed meter 52 configured to receive agricultural product (e.g., seeds) from a hopper 54. In certain embodiments, the vacuum seed meter 52 includes a disc having multiple openings. An air pressure differential between opposite sides of the disc induces the agricultural product (e.g., seeds) to be captured within the openings. As the disc rotates, the agricultural product is conveyed toward the agricultural product conveying system. When the agricultural product (e.g., seed) is aligned with an inlet to the agricultural product conveying system, the air pressure on each side of the disc is substantially equalized (e.g., at the end of a vacuum passage), thereby enabling the agricultural product (e.g., seed) to enter the agricultural product conveying system (e.g., seed tube or powered agricultural product conveyor). The agricultural product conveying system then directs the agricultural product to the trench. While the illustrated embodiment includes a vacuum seed meter, in other embodiments, other suitable seed/agricultural product meters may be utilized. As used herein, "vacuum" refers to an air pressure that is less than the ambient atmospheric air pressure, and not necessarily 0 pa.

In the illustrated embodiment, the row unit 12 also includes a residue management assembly 56 having one or more residue management wheels 58. As illustrated, the residue management assembly 56 is positioned in front of the opener assembly 30 relative to the direction of travel 28, thereby enabling the residue management wheel(s) 58 to break up and/or displace residue and debris (e.g., clods) on the surface 26 of the soil before the opener disc(s) 36 engage the soil 27. In the illustrated embodiment, the residue management wheel(s) 58 are rotatably coupled to an arm 60, and the arm 60 is pivotally coupled to the frame 24 of the row unit 12. In addition, the residue management assembly 56 includes a double-acting air cylinder 62 extending between the arm 60 and the frame 24 of the row unit 12. The double-acting air cylinder 62 is configured to control a force applied by the residue management wheel(s) 58 to the soil 27. While the double-acting air cylinder 62 extends between the frame 24 of the row unit 12 and the arm 60 of the residue management assembly 56 in the illustrated embodiment, in other embodiments, the double-acting air cylinder may extend to any other suitable portion of the residue management assembly, such as to a hub of the residue management wheel(s). Furthermore, in certain embodiments, the residue management assembly, including the residue management wheel(s), the arm, and the double-acting air cylinder, may be omitted.

In the illustrated embodiment, the agricultural implement (e.g., planting implement, planter) includes a control system 64 for the double-acting air cylinders. The control system 64 and the double-acting air cylinders form a pneumatic system 66 of the agricultural implement. As discussed in detail below, each double-acting air cylinder includes a base end and a rod end. While a base end air pressure within the base end is greater than a rod end air pressure within the rod end, the double-acting air cylinder applies a force to the respective ground-engaging tool (e.g., closing disc(s), packer wheel(s), residue management wheel(s), etc.) in a first direction (e.g., downward direction). In addition, while the rod end air pressure within the rod end is greater than the base end air pressure within the base end, the double-acting air cylinder applies a force to the respective ground-engaging tool (e.g., closing disc(s), packer wheel(s), residue management wheel(s), etc.) in a second direction (e.g., upward direction), opposite the first direction. Accordingly, the double-acting air cylinder may control the force applied by the respective ground-engaging tool to the soil.

In the illustrated embodiment, the control system 64 includes a valve assembly 68 fluidly coupled to the base end and the rod end of the closing assembly double-acting air cylinder 41, to the base end and the rod end of the packing assembly double-acting air cylinder 50, and to the base end and the rod end of the residue management assembly double-acting air cylinder 62. The valve assembly 68 is configured to control the base end air pressure within the base end of each double-acting air cylinder, and the valve assembly 68 is configured to control the rod end air pressure within the rod end of each double-acting air cylinder. Accordingly, the valve assembly 68 may control the force applied by each double-acting air cylinder to the respective ground engaging tool.

In addition, the control system 64 includes a controller 70 communicatively coupled to the valve assembly 68. In certain embodiments, the controller 70 is an electronic controller having electrical circuitry configured to control the valve assembly 68. In the illustrated embodiment, the controller 70 includes a processor, such as the illustrated microprocessor 72, and a memory device 74. The controller 70 may also include one or more storage devices and/or other suitable components. The processor 72 may be used to execute software, such as software for controlling the valve assembly, and so forth. Moreover, the processor 72 may include multiple microprocessors, one or more "general-purpose" microprocessors, one or more special-purpose microprocessors, and/or one or more application specific integrated circuits (ASICs), or some combination thereof. For example, the processor 70 may include one or more reduced instruction set (RISC) processors.

The memory device 74 may include a volatile memory, such as random access memory (RAM), and/or a nonvolatile memory, such as read-only memory (ROM). The memory device 74 may store a variety of information and may be used for various purposes. For example, the memory device 74 may store processor-executable instructions (e.g., firmware or software) for the processor 72 to execute, such as instructions for controlling the valve assembly 68, and so forth. The storage device(s) (e.g., nonvolatile storage) may include ROM, flash memory, a hard drive, or any other suitable optical, magnetic, or solid-state storage medium, or a combination thereof. The storage device(s) may store data, instructions (e.g., software or firmware for controlling the valve assembly 68, etc.), and any other suitable data.

Furthermore, in the illustrated embodiment, the control system 64 includes a user interface 76 communicatively coupled to the controller 70. The user interface 76 may include any suitable input devices configured to receive input from an operator, such as button(s), switch(es), knob(s), a keyboard, a mouse, other suitable input device(s), or a combination thereof. In the illustrated embodiment, the user interface 76 includes a display configured to present visual information to the operator. In certain embodiments, the display includes a touch screen interface configured to receive input from the operator. In addition, the user interface may include other suitable device(s) configured present visual and/or audible information to the operator, such as indicator light(s), gauge(s), speaker(s), other suitable output device(s), or a combination thereof.

For each double-acting air cylinder, the controller 70 is configured to determine a target base end air pressure and a target rod end air pressure for the respective double-acting air cylinder based on a target force and a target damping factor of the respective double-acting air cylinder. In addition, the controller 70 is configured to control the valve assembly 68 such that a difference between the base end air pressure of the respective double-acting air cylinder and the target base end air pressure is less than a first threshold value and a difference between the rod end air pressure of the respective double-acting air cylinder and the target rod end air pressure is less than a second threshold value. Accordingly, the controller 70 may control each double-acting air cylinder to substantially achieve the target force and the target damping (e.g., corresponding to the target damping factor). Because the air pressures within the base end and the rod end of the double-acting air cylinder are automatically controlled based on the target force and the target damping factor, operation of the agricultural implement may be readily adjusted for different soil conditions and/or agricultural implement properties (e.g., speed, position, etc.). For example, an operator may input the target force and/or the target damping factor via the user interface, and/or the controller may automatically determine the target force and/or the target damping factor based on feedback from sensor(s) (e.g., feedback indicative of one or more properties of the agricultural implement and/or one or more properties of the agricultural field).

In certain embodiments, the control system 64 may be configured to control each double-acting air cylinder of the agricultural implement. However, in other embodiments, the agricultural implement may include multiple control systems 64, and each control system may be configured to control the double-acting air cylinders of a respective row unit, a respective group of row units, or a respective type of ground-engaging tool (e.g., closing disc(s), packer wheel(s), residue management wheel(s), etc.) across multiple row units. Furthermore, while double-acting air cylinders are used to control the force applied by the closing disc(s), the packer wheel(s), and the residue management wheel(s) to the soil in the illustrated embodiment, in other embodiments, the force applied by at least one of the ground-engaging tools may be controlled by other suitable actuator(s) (e.g., alone or in combination with the double-acting air cylinder), such as other suitable pneumatic actuator(s) (e.g., airbag(s), etc.), hydraulic actuator(s), electromechanical actuator(s), other suitable type(s) of actuator(s), or a combination thereof. In addition, while the pneumatic system is employed within a planting implement/planter in the illustrated embodiment, in other embodiments, the pneumatic system (e.g., including the control system and the double-acting air cylinder(s)) may be utilized within other suitable agricultural implements (e.g., seeding implements/seeders, tillage implements, etc.).

Figure 3:
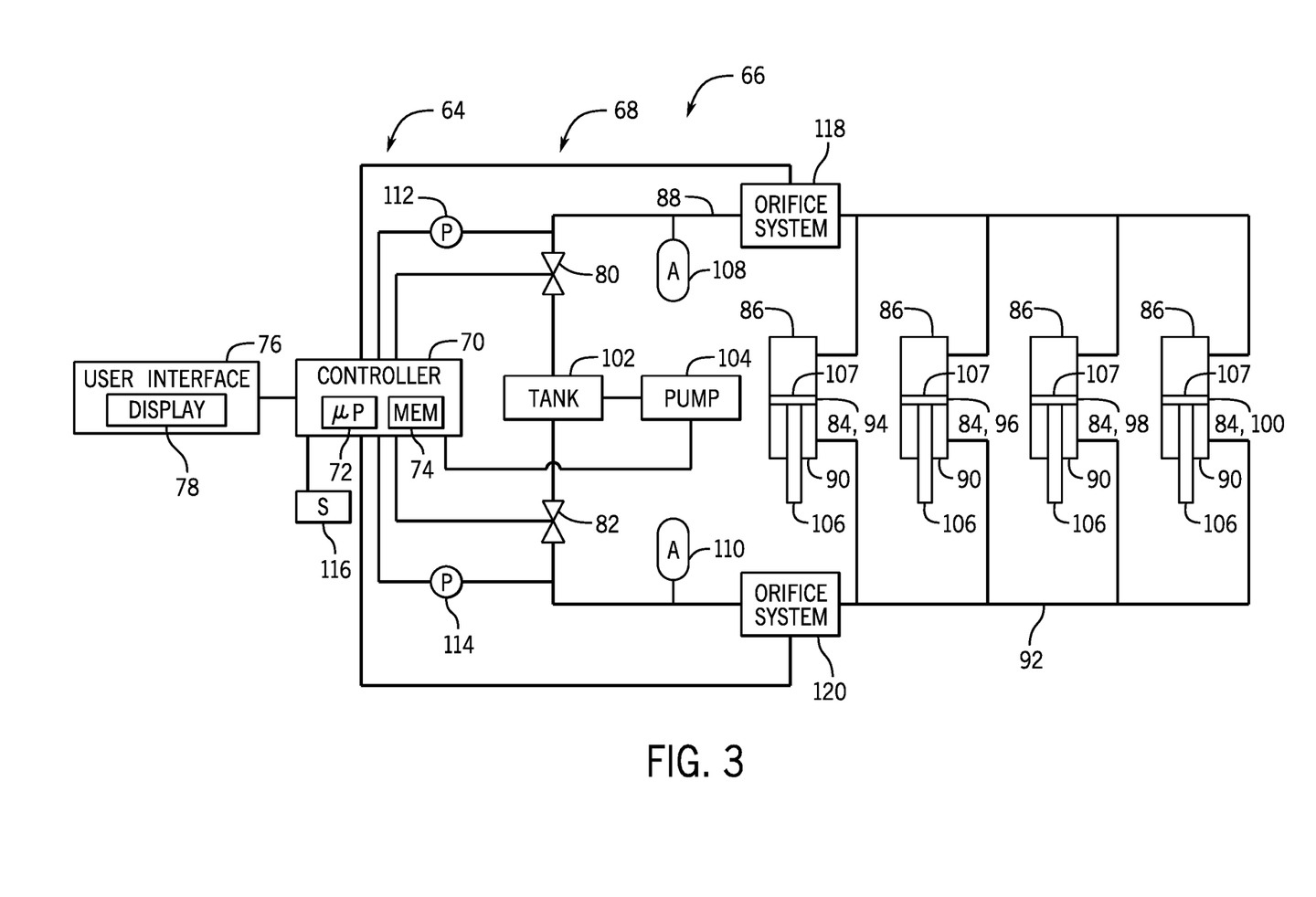
FIG. 3 is a schematic diagram of an embodiment of a pneumatic system that may be employed within the agricultural implement of FIG. 1.

FIG. 3 is a schematic diagram of an embodiment of a pneumatic system 66 that may be employed within the agricultural implement of FIG. 1. As previously discussed, the pneumatic system 66 includes the control system 64 and the double-acting air cylinder(s). Furthermore, as previously discussed, the control system 64 includes the valve assembly 68, the controller 70, and the user interface 76. In the illustrated embodiment, the valve assembly 68 includes a base end control valve 80 and a rod end control valve 82, the base end control valve 80 and the rod end control valve 82 are communicatively coupled to the controller 70, and the base end control valve 80 and the rod end control valve 82 are fluidly coupled to multiple double-acting air cylinders 84. As illustrated, the base end control valve 80 is fluidly coupled to the base ends 86 of the double-acting air cylinders 84 by base end conduits 88, and the rod end control valve 82 is fluidly coupled to the rod ends 90 of the double-acting air cylinders 84 by rod end conduits 92.

In the illustrated embodiment, the pneumatic system 66 includes four double-acting air cylinders 84 fluidly coupled to the valve assembly 68 in a parallel arrangement. Each double-acting air cylinder 84 may correspond to one of the double-acting air cylinders disclosed above, such as the closing assembly double-acting air cylinder, the packing assembly double-acting air cylinder, or the residue management assembly double-acting air cylinder, and each double-acting air cylinder 84 may be disposed on a different row unit. For example, a first double-acting air cylinder 94 may correspond to a residue management assembly double-acting air cylinder of a first row unit, a second double-acting air cylinder 96 may correspond to a residue management assembly double-acting air cylinder of a second row unit, a third double-acting air cylinder 98 may correspond to a residue management assembly double-acting air cylinder of a third row unit, and a fourth double-acting air cylinder 100 may correspond to a residue management assembly double-acting air cylinder of a fourth row unit. Because the double-acting air cylinders 84 are fluidly coupled in a parallel arrangement, the control valves of the valve assembly 68 may control the double-acting air cylinders 84 collectively. While the pneumatic system 66 includes four double-acting air cylinders 84 fluidly coupled to the control valves in a parallel arrangement in the illustrated embodiment, in other embodiments, the pneumatic system may include more or fewer double-acting air cylinders (e.g., 1, 2, 3, 5, 6, or more) fluidly coupled to the control valves in a parallel arrangement (e.g., one double-acting air cylinder for each row unit).

Furthermore, while the pneumatic system 66 includes a single set of control valves within the valve assembly 68 and a single set of double-acting air cylinders 84 in the illustrated embodiment, in other embodiments, the pneumatic system may include multiple sets of control valves (e.g., in which each set of control valves includes a respective base end control valve and a respective rod end control valve) within the valve assembly and multiple respective sets of double-acting air cylinders (e.g., in which each set of double-acting air cylinders includes 1, 2, 3, 4, 5, 6, or more double-acting air cylinders) fluidly coupled to the sets of control valves. For example, in certain embodiments, the pneumatic system may include a first set of control valves/double-acting air cylinders for the closing disc assembly/assemblies, a second set of control valves/double-acting air cylinders for the packing assembly/assemblies, a third set of control valves/double-acting air cylinders for the residue management assembly/assemblies, a fourth set of control valves/double-acting air cylinders for other suitable ground engaging tool(s), or a combination thereof. The double-acting air cylinders within each set of double-acting air cylinders may be fluidly coupled in a parallel arrangement and disposed on separate row units, as disclosed above, to facilitate collective control of the respective ground-engaging tools. Because each set of double-acting air cylinders is fluidly coupled to a respective set of control valves of the valve assembly, the controller may independently control each set of double-acting air cylinders.

In the illustrated embodiment, the pneumatic system 66 includes an air tank 102 and an air pump 104 fluidly coupled to the air tank 102. The air pump 104 is configured to provide the air tank 102 with pressurized air, and the air tank 102 is configured to provide the pressurized air to the double-acting air cylinders 84. As illustrated, the base end control valve 80 and the rod end control valve 82 are fluidly coupled to the air tank 102 and configured to receive pressurized air from the air tank 102. The base end control valve 80 is configured to control air flow from the air tank 102 to the base ends 86 of the double-acting air cylinders 84, and the rod end control valve 82 is configured to control air flow from the air tank 102 to the rod ends 90 of the double-acting air cylinders 84. In the illustrated embodiment, the air pump 104 is communicatively coupled to the controller 70, and the controller 70 is configured to control the output of the air pump 104. For example, the controller 70 may control the air pump 104 (e.g., by selectively engaging the air pump 104) such that the air pressure within the air tank 102 remains above a threshold pressure (e.g., a pressure suitable for operation of the double-acting air cylinders 84). While the pneumatic system 66 includes an air tank 102 in the illustrated embodiment, in other embodiments, the air tank may be omitted, and the air pump may provide the pressurized air directly to the control valves.

Furthermore, the base end control valve 80 is configured to control air flow from the base ends 86 of the double-acting air cylinders 84 to the atmosphere, and the rod end control valve 82 is configured to control air flow from the rod ends 90 of the double-acting air cylinders 84 to the atmosphere. For example, to decrease the air pressure within the base ends 86 of the double-acting air cylinders 84, the base end control valve 80 may vent air within the base ends 86 of the double-acting air cylinders 84 to the atmosphere. In addition, to decrease the air pressure within the rod ends 90 of the double-acting air cylinders 84, the rod end control valve 82 may vent air within the rod ends 90 of the double-acting air cylinders 84 to the atmosphere. While a single base end control valve controls airflow into and out of the base ends of the double-acting air cylinders in the illustrated embodiment, in other embodiments, the valve assembly may include a first base end control valve configured to control airflow into the base ends of the double-acting air cylinders and a second base end control valve configured to control airflow out of the base ends of the double-acting air cylinders. In addition, while a single rod end control valve controls airflow into and out of the rod ends of the double-acting air cylinders in the illustrated embodiment, in other embodiments, the valve assembly may include a first rod end control valve configured to control airflow into the rod ends of the double-acting air cylinders and a second rod end control valve configured to control airflow out of the rod ends of the double-acting air cylinders.

The control system 64 is configured to control the force applied by each double-acting air cylinder 84 and the damping of each double-acting air cylinder 84 by controlling the pressure within the base ends 86 and the rod ends 90 of the double-acting air cylinders 84. For example, to drive a piston rod 106 of each double-acting air cylinder 84 to extend, the controller 78 may control the base end control valve 80 and the rod end control valve 82 such that the base end air pressure within the base end 86 of each double-acting air cylinder 84 is greater than the rod end air pressure within the rod end 90 of the double-acting air cylinder 84. In addition, to drive the piston rod 106 of each double-acting air cylinder 84 to retract, the controller 78 may control the base end control valve 80 and the rod end control valve 82 such that the rod end air pressure within the rod end 90 of each double-acting air cylinder 84 is greater than the base end air pressure within the base end 86 of the double-acting air cylinder 84. Furthermore, as discussed in detail below, the controller is configured to control the damping of each double-acting air cylinder 84 concurrently with the force adjustment.

Because the double-acting air cylinders 84 are fluidly coupled to the control valves in the parallel arrangement, as disclosed above, movement of one piston rod 106 in response to an external force may drive fluid flow through the base end conduits 88 and the rod end conduits 92. For example, contact between a ground-engaging tool and an obstruction within the field may drive the piston rod 106 of the respective double-acting air cylinder 84 to move, thereby driving fluid flow through the conduits. In the illustrated embodiment, the pneumatic system 66 includes a base end accumulator 108 and a rod end accumulator 110. The base end accumulator 108 is fluidly coupled to the base end conduits 88, and the rod end accumulator 110 is fluidly coupled to the rod end conduits 92. Each accumulator is configured to receive air in response to externally driven movement of the piston rod of at least one double-acting air cylinder toward the end (e.g., base end or rod end) fluidly coupled to the accumulator and to provide air in response to externally driven movement of the piston rod of at least one double-acting air cylinder away from the end (e.g., base end or rod end) fluidly coupled to the accumulator. As a result, fluid flow between the externally driven double-acting air cylinder(s) and the other double-acting air cylinder(s) may be substantially reduced, thereby reducing unintended piston rod movement of the other double-acting air cylinder(s). While the pneumatic system includes the base end accumulator and the rod end accumulator in the illustrated embodiment, in other embodiments, at least one accumulator may be omitted.

In the illustrated embodiment, the control system 64 includes a first pressure sensor 112 and a second pressure sensor 114. As illustrated, the first and second pressure sensors are communicatively coupled to the controller 70. The first pressure sensor 112 is configured to output a first sensor signal indicative of the base end air pressure within the base ends 86 of the double-acting air cylinders 84, and the second pressure sensor 114 is configured to output a second sensor signal indicative of the rod end air pressure within the rod ends 90 of the double-acting air cylinders 84. As discussed in detail below, the controller may utilize the feedback from the pressure sensors to control the base end air pressure within the base ends 86 of the double-acting air cylinders 84 and the rod end air pressure within the rod ends 90 of the double-acting air cylinders 84.

The controller 70 is configured to determine a target base end air pressure within the base end(s) 86 and a target rod end air pressure within the rod end(s) 90 of the double-acting air cylinder(s) 84 based on a target force of the double-acting air cylinder(s) 84 and a target damping factor of the double-acting air cylinder(s). The target force of the double-acting air cylinder(s) 84 may be determined based on a target force of the ground-engaging tool coupled to each double-acting air cylinder (e.g., the target force applied by the ground-engaging tool to the soil). For example, if the target force of the ground-engaging tool is greater than the weight of the ground-engaging tool and any arm(s) that couple the ground-engaging tool to the frame of the row unit, the target force of the double-acting air cylinder may be in a downward direction (e.g., downforce). However, if the target force of the ground-engaging tool is less than the weight of the ground-engaging tool and any arm(s) that couple the ground-engaging tool to the frame of the row unit, the target force of the double-acting air cylinder may be an upward direction (e.g., up-force). Furthermore, the target damping factor represents a value (e.g., between 0 and 1) of a target resistance to movement of the double-acting air cylinder. For example, a target damping factor of 0 may correspond to minimum damping of the double-acting air cylinder (e.g., about the least damping the pneumatic system is capable of establishing within the double-acting air cylinder for a force applied by the double-acting air cylinder), and a target damping factor of 1 may correspond to a maximum damping of the double-acting air cylinder (e.g., about the most damping the pneumatic system is capable of establishing within the double-acting air cylinder for a force applied by the double-acting air cylinder). While a damping factor between 0 and 1 is disclosed herein, any suitable numerical representation of the damping factor may be utilized in certain embodiments.

In certain embodiments, the user interface 76 is configured to output a signal indicative of the target force of the double-acting air cylinder(s) and/or the target damping factor of the double-acting air cylinder(s), and the controller 70 is configured to receive the signal from the user interface. For example, the user interface 76 may enable an operator to select from a set of target damping factors. Furthermore, the signal indicative of the target force from the user interface may be indicative of a target contact force between the ground-engaging tool and the soil, and the controller may determine the target force of the double-acting air cylinder based on the target contact force between the ground-engaging tool and the soil (e.g., based on the weight of the ground-engaging tool and any arm(s) that couple the ground-engaging tool to the frame of the row unit). Additionally or alternatively, the controller may receive signal(s) indicative of the target force of the double-acting air cylinder and/or the target damping factor of the double-acting air cylinder from another suitable device/system (e.g., a remote control system, etc.).

Furthermore, in certain embodiments, the controller 70 may determine the target force of the double-acting air cylinder(s) and/or the target damping factor of the double-acting air cylinder(s) based on feedback from one or more sensors 116 (e.g., soil sensor(s), residue monitoring sensor(s), position sensor(s), speed sensor(s), etc.) communicatively coupled to the controller 70. For example, the sensor may output a sensor signal indicative of one or more properties of the agricultural implement (e.g., position, speed, etc.) and/or one or more properties of the agricultural field in which the agricultural implement is located (e.g., soil density, soil moisture, soil composition, terrain roughness, residue density, etc.). In certain embodiments, the controller 70 may increase the target damping factor in response to sensor feedback indicative of rougher terrain, and the controller may decrease the target damping factor in response to smoother terrain. Additionally or alternatively, the controller may increase the target damping factor in response to sensor feedback indicative of a higher implement speed, and the controller may decrease the target damping factor in response to sensor feedback indicative of a lower implement speed. Additionally or alternatively, with regard to controlling the residue management wheel(s), the controller may determine the target force based on sensor feedback indicative of residue density. Additionally or alternatively, with regard to controlling the packer wheel, the controller may determine the target force based on sensor feedback indicative of soil hardness. Furthermore, in certain embodiments, the controller may determine the target force and/or the target damping factor based on sensor feedback indicative of a position of the implement/row unit within a field (e.g., by using one or more maps of the field, such as a soil density map, a residue density map, a terrain map, a soil moisture map, other suitable map(s), or a combination thereof).

In certain embodiments, while the target damping factor is zero (e.g., minimum damping), the controller 70 may determine the target base end air pressure and the target rod end air pressure by setting one of the target base end air pressure or the target rod end air pressure to a lower pressure limit. For example, while the target damping factor is zero and the target force is in the direction of extension of the double-acting air cylinder, the controller 70 may set the target rod end air pressure to the lower pressure limit. The controller 70 may then determine the target base end air pressure based on the target rod end air pressure or the rod end air pressure (e.g., as measured by the second pressure sensor 114) and the target force (e.g., by multiplying the target rod end air pressure/rod end air pressure by an area of the rod side of the piston 107, adding the target force, and dividing by an area of the base side of the piston 107). In addition, while the target damping factor is zero and the target force is in the direction of retraction of the double-acting air cylinder, the controller 70 may set the target base end air pressure to the lower pressure limit. The controller 70 may then determine the target rod end air pressure based on the target base end air pressure or the base end air pressure (e.g., as measured by the first pressure sensor 112) and the target force (e.g., by multiplying the target base end air pressure/base end air pressure by the area of the base side of the piston 107, adding the target force, and dividing by the area of the rod side of the piston 107). Furthermore, in certain embodiments, while the target damping factor is zero (e.g., minimum damping), the controller 70 may determine the target base end air pressure and the target rod end air pressure by minimizing a sum of the target base end air pressure and the target rod end air pressure.

In certain embodiments, while the target damping factor is one (e.g., maximum damping), the controller 70 may determine the target base end air pressure and the target rod end air pressure by setting one of the target base end air pressure or the target rod end air pressure to an upper pressure limit. For example, while the target damping factor is one and the target force is in the direction of extension of the double-acting air cylinder, the controller 70 may set the target base end air pressure to the upper pressure limit. The controller 70 may then determine the target rod end air pressure based on the target base end air pressure or the base end air pressure (e.g., as measured by the first pressure sensor 112) and the target force (e.g., by multiplying the target base end air pressure/base end air pressure by the area of the base side of the piston 107, subtracting the target force, and dividing by the area of the rod side of the piston 107). In addition, while the target damping factor is one and the target force is in the direction of retraction of the double-acting air cylinder, the controller 70 may set the target rod end air pressure to the upper pressure limit. The controller 70 may then determine the target base end air pressure based on the target rod end air pressure or the rod end air pressure (e.g., as measured by the second pressure sensor 114) and the target force (e.g., by multiplying the target rod end air pressure/rod end air pressure by the area of the rod side of the piston 107, subtracting the target force, and dividing by an area of the base side of the piston 107). Furthermore, in certain embodiments, while the target damping factor is one (e.g., maximum damping), the controller 70 may determine the target base end air pressure and the target rod end air pressure by maximizing a sum of the target base end air pressure and the target rod end air pressure.

Furthermore, any suitable relationship may be used to determine the target base end air pressure and the target rod end air pressure based on the target force and the target damping factor. For example, the controller 70 may utilize the following formulas to determine the target base end air pressure and the target rod end air pressure while the target force is in the direction of extension:

$$P_B = (1-D)\left(\frac{F}{A_B} + P_{LL}\frac{A_R}{A_B}\right) + DP_{UL}$$

$$P_R = \frac{P_B A_B - F}{A_R}$$

$P_B$ is the target base end air pressure, $P_R$ is the target rod end air pressure, D is the target damping factor, F is the target force, $A_B$ is an area of the base side of the piston of the double-acting air cylinder, $P_{LL}$ is a lower pressure limit, $A_R$ is an area of the rod side of the piston of the double-acting air cylinder, and $P_{UL}$ is an upper pressure limit. While the target base end air pressure is used to determine the target rod end air pressure, in certain embodiments, the base end air pressure (e.g., as measured by the first sensor) may be used to determine the target rod end air pressure. Furthermore, the controller 70 may utilize the following formulas to determine the target base end air pressure and the target rod end air pressure while the target force is in the direction of retraction of the double-acting air cylinder:

$$P_R = (1-D)\left(\frac{F}{A_R} + P_{LL}\frac{A_B}{A_R}\right) + DP_{UL}$$

$$P_B = \frac{P_R A_R - F}{A_B}$$

While the target rod end air pressure is used to determine the target base end air pressure, in certain embodiments, the rod end air pressure (e.g., as measured by the second sensor) may be used to determine the target base end air pressure. While the controller may use the equations listed above to determine the target rod end air pressure and the target base end air pressure in certain embodiments, in other embodiments, the controller may use other suitable equations to determine the target rod end air pressure and the target base end air pressure based on the target force and the target damping. Furthermore, in certain embodiments, the controller may use another suitable type of relationship to determine the target rod end air pressure and the target base end air pressure based on the target force and the target damping, such as look-up table(s).

Any suitable values may be selected for the lower pressure limit and the upper pressure limit, in which the upper pressure limit is greater than the lower pressure limit. For example, in certain embodiments, the lower pressure limit may be set to atmospheric pressure (e.g., measured atmospheric pressure, determined atmospheric pressure, standard atmospheric pressure, etc.), and/or the upper pressure limit may be set to the pressure within the air tank 102. Additionally or alternatively, in certain embodiments, the lower pressure limit may be set to a value greater than the atmospheric pressure (e.g., measured atmospheric pressure, determined atmospheric pressure, standard atmospheric pressure, etc.), and/or the upper pressure limit may be set to a value less than the pressure within the air tank. Setting the lower pressure limit to a value greater than the atmospheric pressure may reduce the time associated with decreasing pressure within an end of the double-acting air cylinder (e.g., to the lower pressure limit) due to the increased pressure differential between the air pressure within the end and the atmospheric pressure. Furthermore, setting the upper pressure limit to a value less than the pressure within the tank may reduce the time associated with increasing pressure within an end of the double-acting air cylinder (e.g., to the upper pressure limit) due to the increase pressure difference between the air pressure within the end and the tank pressure.

Once the controller determines the target base end air pressure within the base end 86 and the target rod end air pressure within the rod end 90 of the double-acting air cylinder 84 based on the target force of the double-acting air cylinder 84 and the target damping factor of the double-acting air cylinder, the controller may control the valve assembly 68 such that a difference between the base end air pressure (e.g., as measured by the first pressure sensor 112) and the target base end air pressure is less than a first threshold value and a difference between the rod end air pressure (e.g., as measured by the second pressure sensor 114) and the target rod end air pressure is less than a second threshold value. For example, the controller 70 may control the base end control valve 80 such that the difference between the base end air pressure and the target base end air pressure is less than the first threshold value, and the controller 70 may control the rod end control valve 80 such that the difference between the rod end air pressure and the target rod end air pressure is less than the second threshold value. In the illustrated embodiment, the controller 70 may utilize feedback from the pressure sensors to determine the base end air pressure and the rod end air pressure. For example, the controller may determine the base end air pressure within the base end 86 of the double-acting air cylinder 84 based on feedback from the first pressure sensor 112, and the controller may determine the rod end air pressure within the rod end 90 of the double-acting air cylinder 84 based on feedback from the second pressure sensor 114. However, in certain embodiments, the pressure sensors may be omitted, and the controller may adjust the base end air pressure and the rod end air pressure via open loop control of the valve assembly 68. Each threshold value may be any suitable pressure difference (e.g., represented as a pressure or a percentage). For example, at least one threshold value may be a pressure difference of less than 10 percent, less than 5 percent, less than 2 percent, less than 1 percent, or less than 0.5 percent. Furthermore, the first and second threshold values may be the same as one another or different than one another.

In the illustrated embodiment, the control system 64 includes a base end orifice system 118 fluidly coupled to a base end conduit 88 between the base end accumulator 108 and the double-acting air cylinders 84. In addition, the control system 64 includes a rod end orifice system 120 fluidly coupled to a rod end conduit 92 between the rod end accumulator 110 and the double-acting air cylinders 84.

Each orifice system is configured to control an air flow rate through the respective conduit. For example, as previously discussed, each accumulator is configured to receive air in response to externally driven movement of the piston rod of at least one double-acting air cylinder toward the end (e.g., base end or rod end) fluidly coupled to the accumulator and to provide air in response to externally driven movement of the piston rod of at least one double-acting air cylinder away from the end (e.g., base end or rod end) fluidly coupled to the accumulator. Because each orifice system is configured to control the air flow rate through the respective conduit between the respective accumulator and the double-acting air cylinders, the orifice systems may control the damping of the double-acting air cylinders 84 (e.g., alone or in combination with the damping control provided by controlling the air pressure within the double-acting air cylinders, as disclosed above). In the illustrated embodiment, the first orifice system 118 and the second orifice system 120 are communicatively coupled to the controller 70, thereby enabling the controller to adjust the damping of the double-acting air cylinders 84 by controlling the orifice systems. For example, the controller may adjust the damping based on user input and/or based on sensor feedback, as discussed above with regard to determining a target damping factor for the air pressure control process.

In certain embodiments, at least one orifice system includes an adjustable orifice configured to control the air flow rate through the respective conduit by varying an area of the orifice opening. Furthermore, in certain embodiments, at least one orifice system may include multiple orifices, in which the orifices have different orifice opening areas, and a series of valves configured to selectively direct the airflow through a selected orifice to control the air flow rate through the respective conduit. While the pneumatic system includes a single base end orifice system and a single rod end orifice system in the illustrated embodiment, in other embodiments, the pneumatic system may include multiple base end orifice systems and/or multiple rod end orifice systems. For example, in certain embodiments (e.g., embodiments in which at least one accumulator is omitted), the pneumatic system may include one base end orifice system for each double-acting air cylinder, and/or the pneumatic system may include one rod end orifice system for each double-acting air cylinder. In such embodiments, each orifice system may be fluidly coupled to the conduit extending to the respective double-acting air cylinder, and the orifice systems may control the air flow rate between double-acting air cylinders (e.g., in response to externally driven movement of the piston rod of at least one double-acting air cylinder). Furthermore, in certain embodiments, at least one of the illustrated orifice systems may be omitted.

While control of a single double-acting air cylinder is disclosed above for simplicity/clarity, the control system may control each double-acting air cylinder within the illustrated parallel arrangement. Furthermore, the process of controlling the air pressure within the double-acting air cylinders disclosed above may apply to each set of control valves/double-acting air cylinders. In addition, while double-acting air cylinders are disclosed herein, the process of controlling air pressure may be applied to opposing air cylinders (e.g., in which the pistons are coupled to one another, and the air pressure within the base ends is controlled) or to opposing air bags (e.g., in which the air pressure within each air bag is controlled).

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A control system for a double-acting air cylinder of an agricultural implement, comprising:
a valve assembly configured to control a base end air pressure within a base end of the double-acting air cylinder and to control a rod end air pressure within a rod end of the double-acting air cylinder, wherein the double-acting air cylinder is configured to apply a force to a ground-engaging tool of the agricultural implement based on the base end air pressure and the rod end air pressure;
a controller communicatively coupled to the valve assembly, wherein the controller comprises a memory and a processor, and the controller is configured to:
determine a target base end air pressure and a target rod end air pressure based on a target force of the double-acting air cylinder and a target damping factor of the double-acting air cylinder; and
control the valve assembly such that a first difference between the base end air pressure and the target base end air pressure is less than a first threshold value and a second difference between the rod end air pressure and the target rod end air pressure is less than a second threshold value.

2. The control system of claim 1, wherein the controller is configured to determine the target base end air pressure and the target rod end air pressure by setting one of the target base end air pressure or the target rod end air pressure to a lower pressure limit while the target damping factor is zero.

3. The control system of claim 1, wherein the controller is configured to determine the target base end air pressure and the target rod end air pressure by setting one of the target base end air pressure or the target rod end air pressure to an upper pressure limit while the target damping factor is one.

4. The control system of claim 1, wherein the controller is configured to determine the target base end air pressure and the target rod end air pressure by minimizing a sum of the target base end air pressure and the target rod end air pressure while the target damping factor is zero.

5. The control system of claim 1, wherein the controller is configured to determine the target base end air pressure and the target rod end air pressure by maximizing a sum of the target base end air pressure and the target rod end air pressure while the target damping factor is one.

6. The control system of claim 1, comprising a sensor communicatively coupled to the controller and configured to output a signal indicative of at least one property of the agricultural implement, at least one property of an agricultural field in which the agricultural implement is located, or a combination thereof, wherein the controller is configured to determine the target force, the target damping factor, or a combination thereof, based on the at least one property of the agricultural implement, the at least one property of the agricultural field, or the combination thereof.

7. The control system of claim 1, comprising a base end orifice system and a rod end orifice system, the base end orifice system is configured to control an air flow rate into and out of the base end of the double-acting air cylinder, the rod end orifice system is configured to control an air flow rate into and out of the rod end of the double-acting air cylinder, the base end orifice system and the rod end orifice system are communicatively coupled to the controller, and the controller is configured to control the base end orifice system and the rod end orifice system to control damping of the double-acting air cylinder.

8. A method for controlling a double-acting air cylinder of an agricultural implement, comprising:
    determining, via a controller having a memory and a processor, a target base end air pressure and a target rod end air pressure for the double-acting air cylinder based on a target force of the double-acting air cylinder and a target damping factor of the double-acting air cylinder, wherein the double-acting air cylinder is configured to apply a force to a ground-engaging tool of the agricultural implement based on a base end air pressure within a base end of the double-acting air cylinder and a rod end air pressure within a rod end of the double-acting air cylinder; and
    controlling, via the controller, a valve assembly such that a first difference between the base end air pressure and the target base end air pressure is less than a first threshold value and a second difference between the rod end air pressure and the target rod end air pressure is less than a second threshold value, wherein the valve assembly is configured to control the base end air pressure within the base end of the double-acting air cylinder and the rod end air pressure within the rod end of the double-acting air cylinder.

9. The method of claim 8, wherein determining the target base end air pressure and the target rod end air pressure comprises setting one of the target base end air pressure or the target rod end air pressure to a lower pressure limit while the target damping factor is zero.

10. The method of claim 8, wherein determining the target base end air pressure and the target rod end air pressure comprises setting one of the target base end air pressure or the target rod end air pressure to an upper pressure limit while the target damping factor is one.

11. The method of claim 8, wherein determining the target base end air pressure and the target rod end air pressure comprises minimizing a sum of the target base end air pressure and the target rod end air pressure while the target damping factor is zero.

12. The method of claim 8, wherein determining the target base end air pressure and the target rod end air pressure comprises maximizing a sum of the target base end air pressure and the target rod end air pressure while the target damping factor is one.

13. The method of claim 8, comprising determining, via the controller, the target force, the target damping factor, or a combination thereof based on feedback from a sensor indicative of at least one property of the agricultural implement, at least one property of an agricultural field in which the agricultural implement is located, or a combination thereof.

14. A pneumatic system for an agricultural implement, comprising:
    a double-acting air cylinder comprising a base end and a rod end, wherein the double-acting air cylinder is configured to apply a force to a ground-engaging tool of the agricultural implement;
    a control system comprising:
        a valve assembly communicatively coupled to the base end and to the rod end of the double-acting air cylinder, wherein the valve assembly is configured to control a base end air pressure within the base end of the double-acting air cylinder and to control a rod end air pressure within the rod end of the double-acting air cylinder;
        a controller communicatively coupled to the valve assembly, wherein the controller comprises a memory and a processor, and the controller is configured to:
            determine a target base end air pressure and a target rod end air pressure based on a target force of the double-acting air cylinder and a target damping factor of the double-acting air cylinder; and
            control the valve assembly such that a first difference between the base end air pressure and the target base end air pressure is less than a first threshold value and a second difference between the rod end air pressure and the target rod end air pressure is less than a second threshold value.

15. The pneumatic system of claim 14, wherein the control system comprises a first pressure sensor and a second pressure sensor, wherein the first and second pressure sensors are communicatively coupled to the controller, the first pressure sensor is configured to output a first sensor signal indicative of the base end air pressure, and the second pressure sensor is configured to output a second sensor signal indicative of the rod end air pressure.

16. The pneumatic system of claim 14, wherein the control system comprises a user interface communicatively coupled to the controller, wherein the user interface is configured to output a signal indicative of the target force, the target damping factor, or a combination thereof, to the controller.

17. The pneumatic system of claim 14, wherein the controller is configured to determine the target base end air pressure and the target rod end air pressure by setting one of the target base end air pressure or the target rod end air pressure to a lower pressure limit while the target damping factor is zero.

18. The pneumatic system of claim 14, wherein the controller is configured to determine the target base end air pressure and the target rod end air pressure by setting one of the target base end air pressure or the target rod end air pressure to an upper pressure limit while the target damping factor is one.

19. The pneumatic system of claim 14, wherein the controller is configured to:
    determine the target base end air pressure and the target rod end air pressure by minimizing a sum of the target base end air pressure and the target rod end air pressure while the target damping factor is zero; and
    determine the target base end air pressure and the target rod end air pressure by maximizing a sum of the target base end air pressure and the target rod end air pressure while the target damping factor is one.

20. The pneumatic system of claim 14, wherein the control system comprises a sensor communicatively coupled to the controller and configured to output a signal indicative of at least one property of the agricultural implement, at least one property of an agricultural field in which the agricultural implement is located, or a combination thereof, wherein the controller is configured to determine the target force, the target damping factor, or a combination thereof, based on the at least one property of the agricultural implement, the at least one property of the agricultural field, or the combination thereof.

\* \* \* \* \*